United States Patent
Johnson et al.

(10) Patent No.: US 9,846,787 B2
(45) Date of Patent: *Dec. 19, 2017

(54) SYSTEM AND METHOD FOR IMPLEMENTING A TRUSTED DYNAMIC LAUNCH AND TRUSTED PLATFORM MODULE (TPM) USING SECURE ENCLAVES

(71) Applicant: INTEL CORPORATION, Santa Clara, CA (US)

(72) Inventors: Simon P. Johnson, Beaverton, OR (US); Vincent R. Scarlata, Beaverton, OR (US); Willard M. Wiseman, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/633,701

(22) Filed: Feb. 27, 2015

(65) Prior Publication Data
US 2015/0186680 A1     Jul. 2, 2015

Related U.S. Application Data

(63) Continuation of application No. 13/843,954, filed on Mar. 15, 2013, now Pat. No. 9,059,855, which is a
(Continued)

(51) Int. Cl.
| | |
|---|---|
| G06F 21/00 | (2013.01) |
| G06F 21/71 | (2013.01) |
| G06F 21/10 | (2013.01) |
| G06F 21/57 | (2013.01) |
| H04L 9/32  | (2006.01) |

(52) U.S. Cl.
CPC .............. *G06F 21/71* (2013.01); *G06F 21/10* (2013.01); *G06F 21/57* (2013.01); *H04L 9/3234* (2013.01);
(Continued)

(58) Field of Classification Search
CPC ...................................................... H04L 9/3234
See application file for complete search history.

(56) References Cited

U.S. PATENT DOCUMENTS

| | | |
|---|---|---|
| 7,711,960 B2 | 5/2010 | Scarlata |
| 2006/0212939 A1 | 9/2006 | England et al. |

(Continued)

OTHER PUBLICATIONS

PCT International Search Report for PCT Counterpart Application No. PCT/US2011/063469, 3 pgs., (Jun. 15, 2012).

(Continued)

*Primary Examiner* — Brandon Hoffman
*Assistant Examiner* — Helai Salehi
(74) *Attorney, Agent, or Firm* — Nicholson De Vos Webster & Elliott LLP

(57) ABSTRACT

An apparatus and method are described for implementing a trusted dynamic launch and trusted platform module (TPM) using a secure enclave. For example, a computer-implemented method according to one embodiment of the invention comprises: initializing a secure enclave in response to a first command, the secure enclave comprising a trusted software execution environment which prevents software executing outside the enclave from having access to software and data inside the enclave; and executing a trusted platform module (TPM) from within the secure enclave, the trusted platform module securely reading data from a set of platform control registers (PCR) in a processor or chipset component into a memory region allocated to the secure enclave.

23 Claims, 5 Drawing Sheets

Related U.S. Application Data continuation of application No. 12/976,831, filed on Dec. 22, 2010, now Pat. No. 8,832,452.

(52) U.S. Cl.
CPC ............ *G06F 2221/0748* (2013.01); *G06F 2221/0797* (2013.01)

(56) References Cited

U.S. PATENT DOCUMENTS

| | | | |
|---|---|---|---|
| 2007/0073416 A1* | 3/2007 | Grawrock | G06F 21/57 700/1 |
| 2007/0136577 A1 | 6/2007 | Bade et al. | |
| 2007/0192864 A1 | 8/2007 | Bryant et al. | |
| 2008/0077994 A1* | 3/2008 | Comlekoglu | G06F 21/53 726/27 |
| 2010/0031370 A1* | 2/2010 | Ellison | G06F 21/575 726/27 |

OTHER PUBLICATIONS

PCT Written Opinion of the International Searching Authority for PCT Counterpart Application No. PCT/US2011/063469, 4 pgs., (Jun. 15, 2012).

PCT Notification concerning Transmittal of Copy of International Preliminary Report on Patentability (Chapter 1 of the Patent Cooperation Treaty) for PCT Counterpart Application No. PCT/US2011/063469, 6 pgs., (Jul. 4, 2013).

\* cited by examiner

SYSTEM AND METHOD FOR IMPLEMENTING A TRUSTED DYNAMIC LAUNCH AND TRUSTED PLATFORM MODULE (TPM) USING SECURE ENCLAVES

CLAIM TO PRIORITY

This present application is a continuation of U.S. patent application Ser. No. 13/843,954, filed on Mar. 13, 2013, entitled "SYSTEM AND METHOD FOR IMPLEMENTING A TRUSTED DYNAMIC LAUNCH AND TRUSTED PLATFORM MODULE (TPM) USING SECURE ENCLAVES" which is a Continuation application of U.S. patent application Ser. No. 12/976,831, filed on Dec. 22, 2010 entitled "SYSTEM AND METHOD FOR IMPLEMENTING A TRUSTED DYNAMIC LAUNCH AND TRUSTED PLATFORM MODULE (TPM) USING SECURE ENCLAVES", U.S. Pat. No. 8,832,452, which is incorporation herein by reference.

BACKGROUND

Field of the Invention

This invention relates generally to the field of computer systems. More particularly, the invention relates to a system and method for implementing a trusted dynamic launch and trusted platform module (TPM) using secure enclaves.

Description of the Related Art

The assignee of the present patent application has designed a trusted computing platform known as Trusted Execution Technology ("TXT") within some microprocessors and respective chipsets to provide computer users and computer system providers with a higher level of trust and control over computer systems. Currently, TXT is employed as a way to defend against software-based attacks aimed at accessing sensitive information. Although often used as a security technology, TXT may also be used to enable development of more advanced, tamper-resistant forms of digital rights management (DRM) and can be used to achieve vendor lock-in for hardware platforms.

Current TXT implementations consist of a set of hardware enhancements allowing the creation of multiple separated execution environments, sometimes referred to as "partitions." One particular hardware component used with current TXT implementations is known as the Trusted Platform Module (TPM), which provides secure key generation and storage, as well as authenticated access to data encrypted by generated keys. The private key stored in the TPM is generally not available to the owner of the computer system, and never leaves the TPM chip under normal operation. The TPM that manages Trusted Platform requests generates keys and certificates for private environments (e.g., applications or service spaces) and manages the machine trust state to allow, for example, a local user (or even a remote party) to check the security on a workstation with a higher level of confidence using the Remote Attestation Protocol.

As illustrated in FIG. 1, a TPM module 100 includes an I/O port 120 for receiving TPM commands from the execution environment, processing the commands and communicating the results over a system bus (typically a low pin count (LPC) bus). An execution engine 104 executes program code 107 in response to the TPM commands and utilizes a variety of different TPM components to perform the necessary operations including a secure hash algorithm 1 (SHA-1) component 109 for performing SHA-1 hash operations; a random number generator 110 for generating random numbers; an attestation identify key (AIK) component 111 for securely establishing that a remote entity is communicating with the TPM; an RSA engine 105 for implementing RSA encryption and digital signatures; and a key generation module 106 for generating keys.

The TPM is an "opt-in" device meaning that the platform owner must take specific steps to turn the TPM on. An opt-in module 108 securely stores the platform owner's selection of the state of the TPM.

In addition, a non-volatile memory 101 and a volatile memory 102 are provided to store long term and temporary values, respectively, while executing TPM commands. Finally, a set of platform control registers (PCRs) are provided to keep track of measurements reported to the TPM. The *PC Client Spec* (TCG 2005a) specification requires a minimum of 24 PCRs. Reading and writing to a PCR requires specific TPM ordinals. When an entity needs to store a measurement in the TPM, the TPM provides an assurance that no other entity can change the measured value by not allowing any entity to write directly to the TPM. Rather, the entity "extends" the specified PCR. The extend operation concatenates the current PCR value with the new value and performs an SHA-1 hash on the concatenated value. The resulting hash value is the new PC value. A detailed description of the TPM can be found, for example, in David Grawrock, *The Intel Safer Computing Initiative, Building Blocks for Trusted Computing*, Intel Press (2006) (hereinafter "Grawrock") at 119-142, and in the *PC Client Spec* referenced above.

For effective security it is important to know what causes the launch of a protected partition. Consequently, the CPU protection modes must receive proper initialization. To this end, current TXT implementations use Safer Mode Extensions (SMX) and Virtual Mode Extensions (VMX) and controls them through the CPU commands GETSEC [SENTER] and GETSEC [SEXIT]. A detailed description of these commands can be found in Grawrock at pages 185-212. Briefly, GETSEC is the CPU instruction that implements SMX extensions. The GETSEC [SENTER] operation provides for the creation of a secure partition during runtime, without the need to reboot the computer system. The GETSEC [SEXIT] instruction is then used to ensure the complete removal of all CPU state associated with the protected partition.

Currently, a dedicated TPM chip is required to implement a TXT environment as described above. As such, TXT implementations are not typically used on small form-factor, low cost computing platforms. Thus, to reduce the cost and complexity associated with TXT implementations, it would be beneficial to provide a solution which does not require a dedicated TPM chip.

BRIEF DESCRIPTION OF THE DRAWINGS

A better understanding of the present invention can be obtained from the following detailed description in conjunction with the following drawings, in which.

DETAILED DESCRIPTION

Figure 1:
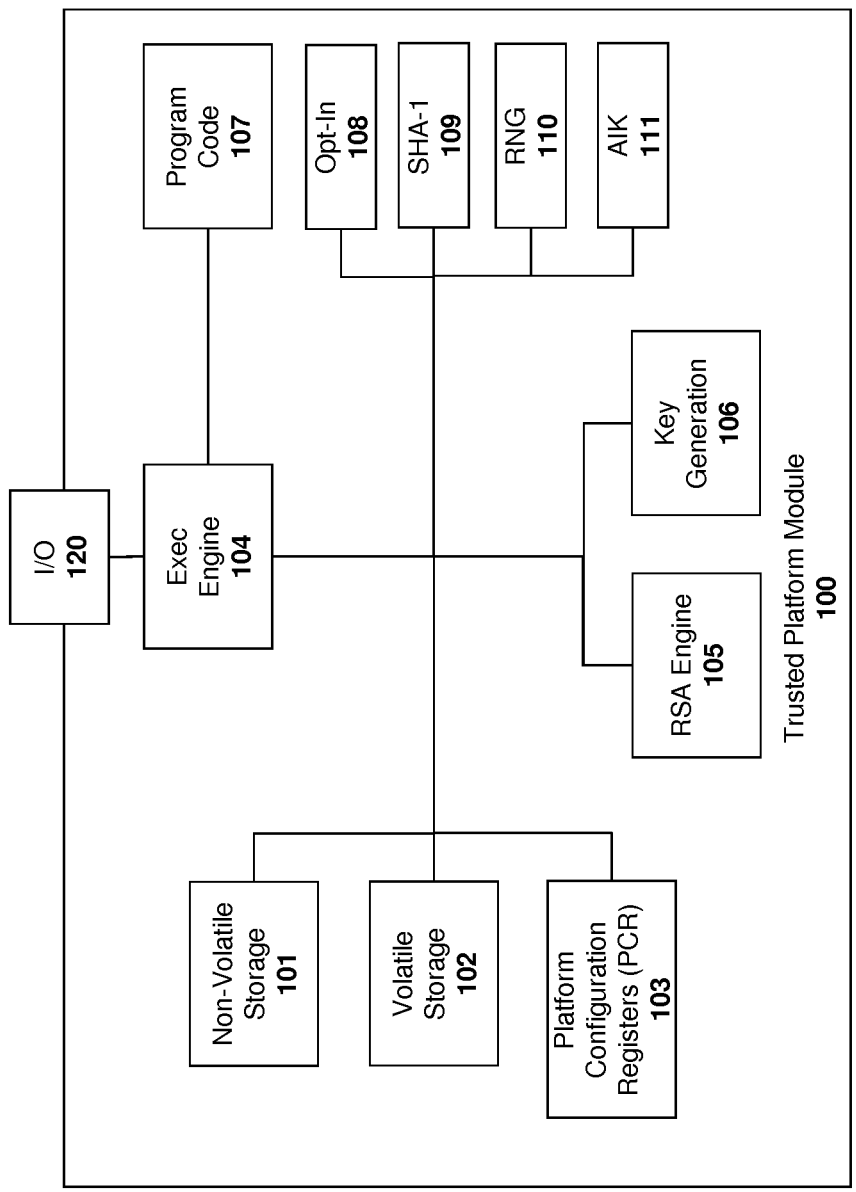
FIG. 1 illustrates a prior art trusted platform module which may be used within a Trusted Execution Technology (TXT) environment.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention provides a software-based solution using limited hardware for implementing trusted computing base (TCB) measurement and attestation features. Specifically, one embodiment of the invention uses Secure Enclaves, hardware registers which behave like TPM platform configuration registers (PCRs), and a small amount of non-volatile storage to implement a software-based TPM and provide functionality which is equivalent to the GETSEC [SENTER] instruction. The embodiments discussed below enable the measurement and launch of a Measured Launched Environment and SMI Transfer Monitor (STM). Embodiments of the invention also provide TPM-equivalent functionality by exposing hardware registers and non-volatile RAM to a Secure Enclave-based TPM implementation.

Briefly, embodiments of the invention provide the above functionality using the following components:

Platform Configuration Registers (PCRs) provided by hardware primitives which extend and reset in the same manner as TPM PCRs.

Non-volatile RAM: One embodiment of the invention exposes and controls access to a relatively small amount of non-volatile memory which provides the basis for securing TPM NV-RAM and TXT Launch Control Policy data. The NV-RAM also provides the bases for the TPM monotonic counter features which, as described below, are exposed by the TPM secure enclave.

TPM Root Key: In order to protect user data secrets and TPM data assets, one embodiment of the invention of the invention provides TPM secure execution with a root key that has the following unique characteristics: (1) the key is platform specific; (2) the key is platform owner specific; and (3) the key is specific to the TPM secure execution environment.

TPM Secure Execution Environment: One embodiment of the invention uses Secure Enclaves or a similar technology to provide a secure execution environment. This environment hosts a software implementation of the TPM specification using the TPM Key (mentioned above) to secure its data assets, and those of the user. The hardware primitives (also mentioned above) are also exposed securely to the secure execution environment for use by the TPM software.

Dynamic Root of Trust Measurement (DRTM) Launch Enclave: Embodiments of the invention discussed below also use secure enclaves (or similar technology) to provide a software implementation of the TXT GETSEC [SENTER] instruction. This enclave may provide the following features:

1) The DRTM enclave rendezvous all hardware threads on the platform in preparation for the launch of the Measured Launched Environment (MLE).
2) The DRTM enclave prevents errant threads and no-host processing agents from affecting launch
3) The DRTM enclave ensures that Memory Configuration of the platform has been established correctly.
4) The DRTM enclave reports (using the hardware configuration registers) the Launch Policy (i.e. Intel TXT Launch Control Policy) that was applied at launch and which entity (i.e., which DRTM enclave) applied it.
5) The DRTM enclave verifies and sets the platform hardware configuration required to protect the MLE (e.g., the Intel Virtualization Technology for Directed I/O (VT-d) tables for DMA protection). Currently, VT-d enables protection by restricting direct memory access (DMA) of devices to pre-assigned domains or physical memory regions. This is achieved by a hardware capability known as DMA-remapping.
6) The DRTM enclave computes a cryptographic measurement of the system management interrupt (SMI) transfer monitor, and records the measurement using the hardware configuration registers.
7) The DRTM enclave computes a cryptographic measurement of the MLE, records that measurement using the hardware configuration registers and passes execution control to the MLE.

Figure 2:
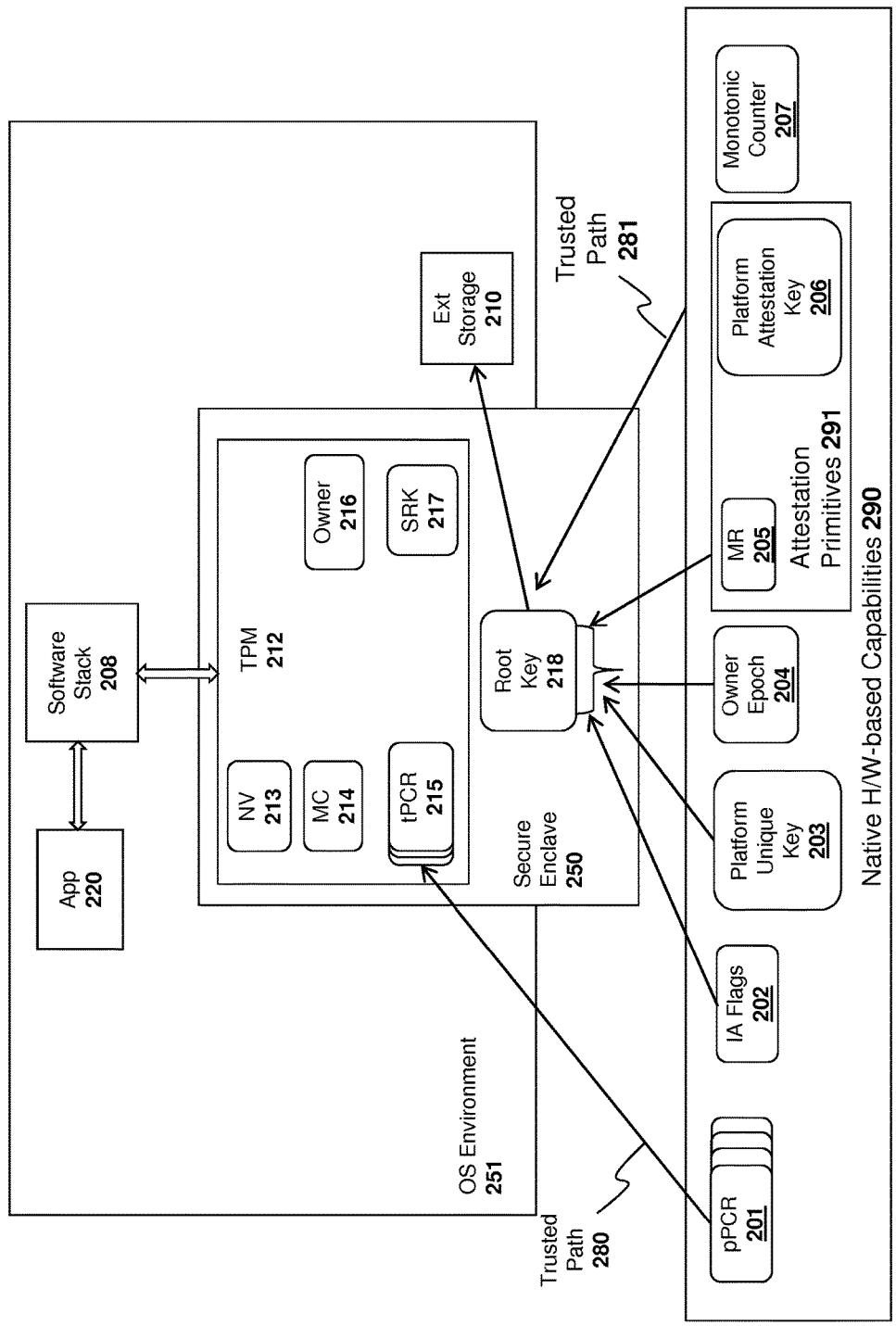
FIG. 2 illustrates one embodiment of an apparatus for implementing a trusted platform module (TPM) using secure enclaves.

One embodiment of a system architecture for implementing a software-based TPM 212 within a secure enclave 250 is illustrated in FIG. 2. As mentioned above, the secure enclave 250 is a trusted software execution environment which prevents software executing outside the enclave from having access to software and data inside the enclave. One embodiment of a secure enclave is described in the co-pending U.S. Patent Application entitled Method and Apparatus to Provide Secure Application Execution, filed Nov. 13, 2009, Ser. No. 12/590,767, and in the co-pending PCT Patent Application entitled Method and Apparatus to Provide Secure Application Execution, filed Dec. 22, 2009, Application No. PCT/US2009/069212, which are both incorporated herein by reference. These applications are referred to herein collectively as the "co-pending applications."

Figure 3:
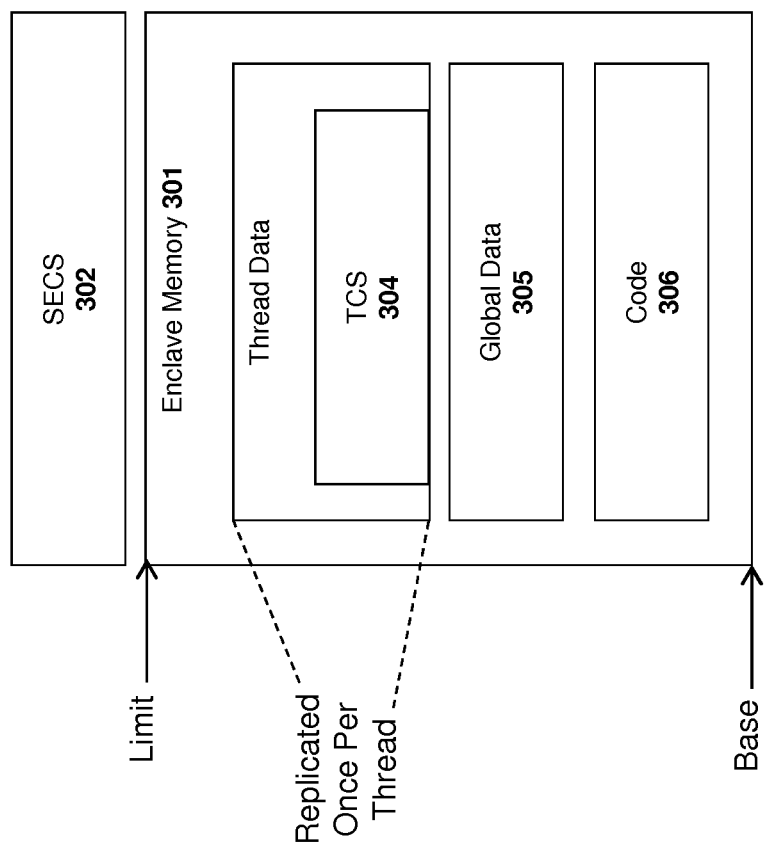
FIG. 3 illustrates a secure enclave control store and an enclave memory in accordance with one embodiment of the invention.
Figure 4:
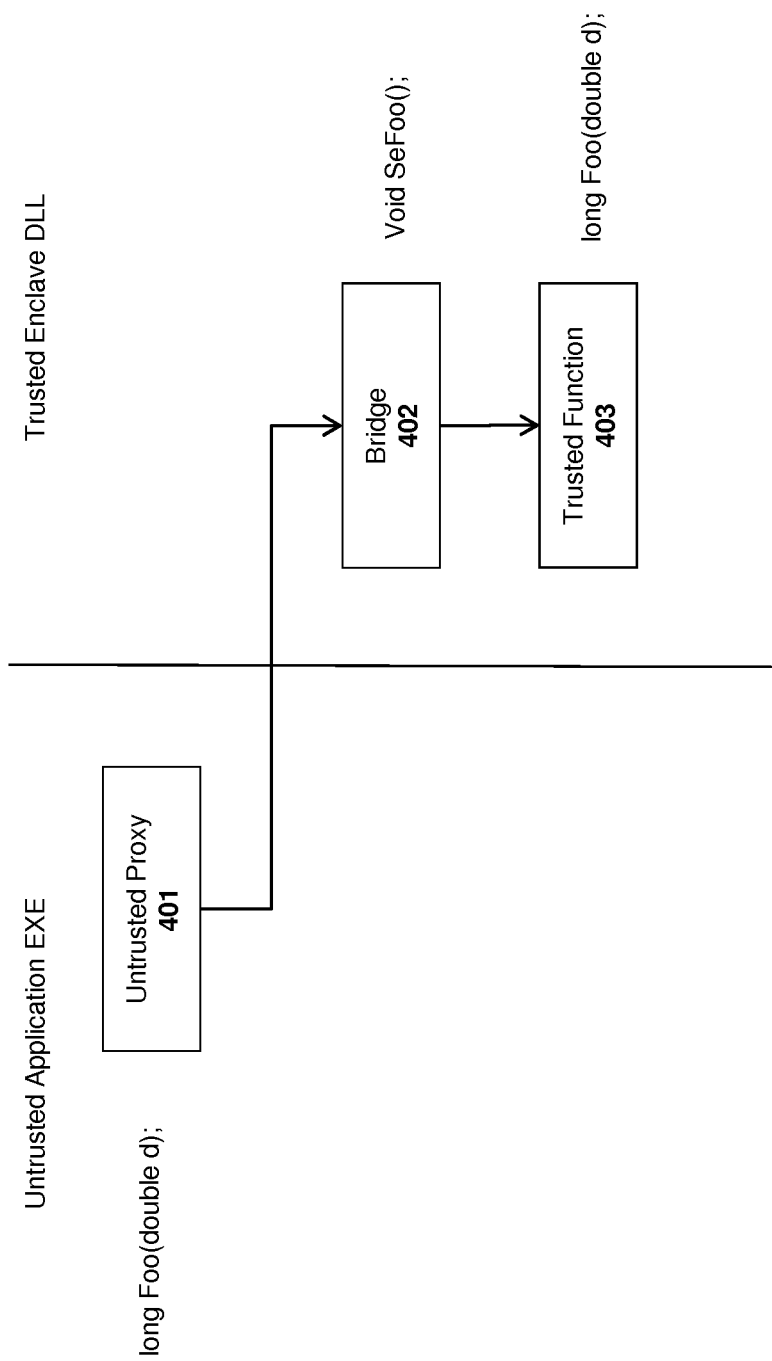
FIG. 4 illustrate proxy and bridge edge routines implemented in one embodiment of the invention.
Figure 5:
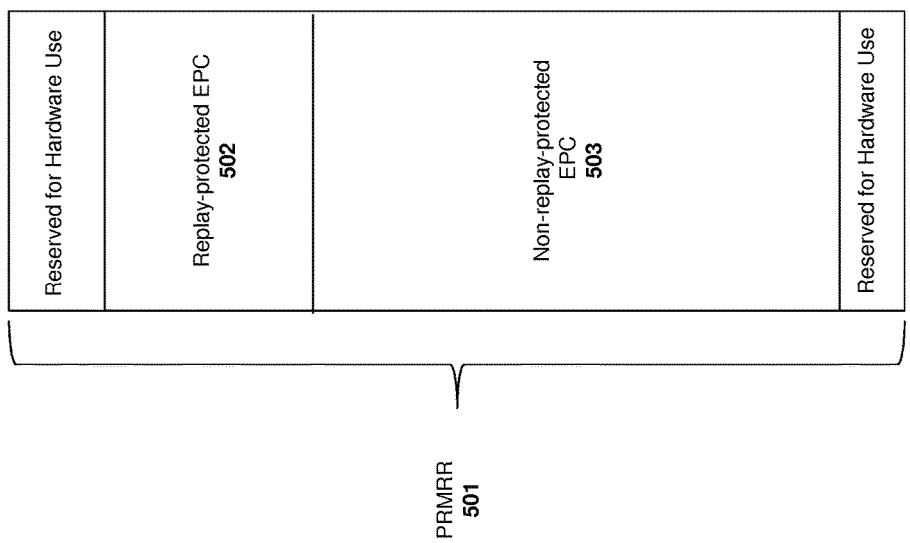
FIG. 5 illustrates one embodiment of a conceptual layout of processor reserved memory (PRM) and an enclave page cache (EPC).

This application will now describe certain aspects of secure enclave design as described in the co-pending applications and illustrated in FIGS. 3-5. Following this description, a detailed description of implementing a TPM using a secure enclave will be provided with respect to FIG. 2.

As described in the co-pending applications, a secure enclave 250 is carved out of the virtual address space of its containing process. A complete description of secure enclave creation, management and termination can be found in the co-pending applications. All memory management of the enclave is performed in terms of virtual addresses. Enclave memory management is divided into two parts: address space allocation and memory commitment. Address space allocation is the specification of a maximal range of addresses that the enclave may use. No actual resources are committed to this region. Memory commitment is the assignment of actual memory resources (as pages) within the allocated address space. This two-phase technique allows enclaves to flexibly control their memory usage and allow for growth without overusing memory resources when enclave needs are low. Commitment adds virtual pages to the enclave.

This distinction is reflected in the two instructions ECREATE and EADD. ECREATE allocates a range of addresses for use by the enclave. EADD commits virtual memory pages within that range to the enclave. An operating system may support separate allocate and commit operations. For example, the Windows API VirtualAlloc takes a flag argument of MEM_RESERVE (allocation) or MEM_COMMIT (commitment). It is not required that an OS support this separation, but its presence can make memory management within an enclave more flexible and efficient.

In one embodiment, a secure enclave 250 is created using the ECREATE instruction, specifying a Base and size of the virtual address space range in which the enclave is to be built. Memory is added to the secure enclave before it is sealed. One embodiment of enclave memory layout is illustrated in FIG. 3.

The enclave creation and commitment process is best illustrated by example using the Windows API. An address space region is reserved in the process using VirtualAlloc, passing in the MEM_RESERVE flag. This reserves a region of memory 301 without actually committing any physical memory or page file storage.

1) Commit the first page of the enclave by calling VirtualAlloc again, this time with the MEM_COMMIT flag.

2) Use the ECREATE instruction to set up the initial environment, specifying the same address range as in step 1.

3) For each additional page to be added to the enclave:

4) VirtualAlloc the enclave page 301.

5) Use EADD to add the new page to the enclave.

6) Use EEXTEND to add a measurement for 128 bytes of the page. Call this instruction until the entire enclave is measured.

7) If a contiguous set of enclave pages is to be added at once, the above steps can be reordered and optimized to minimize the number of system calls.

8) On operating systems that do not support separate reserve and commit operations, the VirtualAlloc in step 1 can be replaced by a simple malloc, for example, and the remaining calls to VirtualAlloc eliminated.

Because the ECREATE and EADD instructions enable encryption and integrity for the added page, it is not possible for non-enclave software to initialize this memory after it has been added to the enclave. The runtime system must completely initialize any memory for which it is responsible before EADDing it. This typically requires the runtime system to build the enclave image in-place, even before calling ECREATE (i.e., because SECS cannot be modified by software after ECREATE). Once memory has been initialized, the enclave ECREATEd and its memory EADDed, it may be sealed and measured as described herein.

In one embodiment, there are two data structures inside the enclave, the Secure Enclave Control Store (SECS) 302 and the Thread Control Structure (TCS) 304. SECS and TCS contain architectural information and non-architectural convenience fields used by the runtime software. All of the convenience fields and a few of the architectural fields are initialized by software. During enclave creation, code 306 and data 305 for an enclave may be loaded from a clear-text source. It is not possible to load encrypted code and/or data directly into an enclave during creation. However, code and/or data from an encrypted source may be installed into an enclave by first loading a trusted loader into the enclave. Once the enclave is running, this loader can then be used to install secret code/data into the enclave. Details of this procedure are beyond the scope of the present application.

Once the SECS 302, one or more TCSs 304 and the code 306 and data 305 have been EADDed, the enclave creation is completed by the EINIT instruction. This instruction stops further measurement information from being written into a measurement register (MR) (sometimes referred to in the co-pending applications as "IRO"). After EINIT no further pages may be added to the enclave.

Untrusted code calls into the enclave using the EENTER instruction and the enclave returns back to the untrusted caller via EEXIT. On enclave entry, control is transferred to code which switches the stack pointer to one inside the enclave. When returning the software again swaps the stack pointer then executes the EEXIT instruction.

In non-enclave mode, subroutine parameters are generally pushed onto the stack. The called routine, being aware of its own stack layout, knows how to find parameters based on compile-time-computable offsets from the SP or BP register (depending on runtime conventions used by the compiler).

Because of the stack switch when calling an enclave, stack-located parameters cannot be found in this manner. Edge routines (untrusted procedures that ECALL and trusted procedures that are the target of ECALL) are required to define a different parameter passing convention for parameters that cannot fit in registers. For example, the caller might push parameters onto the untrusted stack and then pass a pointer to those parameters in AX. The exact choice of calling conventions is up to the writer of the edge routines; be those routines hand-coded or compiler generated. As illustrated in FIG. 4, the proxy routine 401 (on the caller's side of the enclave boundary) is responsible for marshalling parameters in a runtime-system-defined format and passing them to the bridge routine 402 on the other side of the boundary which hands off to a trusted function 403.

As with most systems, it is the responsibility of the callee to preserve all registers except that used for returning a value. This is consistent with conventional usage and tends to optimize the number of register save/restore operations that need be performed. It has the additional security result that it ensures that data is scrubbed from any registers that were used to temporarily contain secrets.

No registers are modified during EEXIT. This requires that the software scrub all secrets from registers before returning. This could be done in the bridge function 402 or it could simply rely on the standard register preservation across procedure calls that compilers typically emit as prolog/epilog.

Calling an untrusted procedure from an enclave also uses the EEXIT instruction. While there is a stack switch back to the untrusted stack, the EEXIT contains a destination address which is the procedure.

In order to avoid leaking secrets though values left over in registers, the trusted software clears all computation registers except for AX (which may be used for parameter passing). This is necessary because even the most aggressively optimizing compilers do not perform the flow analysis to answer the question—did register X ever contain an intermediate value during the lifetime of this call tree? Thus, it cannot be determined which registers might contain secrets and which are safe. As a result of this clearing, edge routines save registers before the EEXIT and restore them after the EENTER returns. No registers are modified during EENTER. Since there are no secrets generated or used by the untrusted CALLee, this is not necessary.

To destroy the enclave, the EPC manager, either a driver or the OS can reclaim the enclave's EPC memory by using the EREMOVE instruction. This removes a page of memory from the EPC. The EPC manager uses EREMOVE on every page.

As illustrated in FIG. 5, the Enclave Page Cache (EPC) 403 is a secure storage used by the CPU to store enclave pages when they are a part of executing enclave. In one embodiment, the following requirements are identified on the EPC.

1. Any accesses to the enclave memory pages loaded into the EPC that belong to non-debug enclaves must be protected from any modification by software entities outside that enclave.

2. Attackers should not be able to read plain-text data belonging to non-debug enclaves that is loaded into the EPC via straight-forward hardware attacks.

3. Attackers should not be able to able to modify data in the EPC that belongs to non-debug enclaves via straight-forward hardware attacks.

4. Any data loaded into the EPC must be accessible coherently, yet securely from any CPU in the system.

There are several mechanisms of implementing the EPC 503. The EPC may be implemented as on on-die SRAM or eDRAM. The EPC may also be constructed by dynamically sequestering ways of the CPU's last-level cache. In such an implementation, the EPC must be protected from un-authorized accesses from outside the package. However, other packages in the system must be able to access the EPC coherently, yet securely.

Another mechanism of implementing EPC 503 is to implement a Memory Encryption Engine (MEE). MEE provides a cost-effective mechanism of creating cryptographically protected volatile storage using platform DRAM. MEE uses one or more strategically placed cryptographic units in the CPU uncore to provide varying levels of protection, as needed by the customer technology. The various uncore agents are modified to recognize the memory accesses going to the MEE, and to route those accesses to a Crypto Controller located in the uncore. The Crypto Controller, depending on the desired protection level, generates one or more memory accesses to the platform DRAM to fetch the cipher-text. It then processes the cipher-text to generate the plain-text, and satisfies the original MEE memory request. MEE fully integrates into the Intel QuickPath Interconnect (QPI) protocol, and scales to multi-package platforms, with security extensions to the QPI protocol. In a multi-package platform configuration, MEE protects memory transfers between Intel CPUs using a crypto engine in the externally facing QPI link layers.

In one embodiment, the EPC is divided into chunks of 4 KB pages and is aligned into a 4 KB boundary. Each 4 KB chunk of EPC is called an EPC page. EPC is used to hold pages belonging to each running instance of an enclave. Pages in the EPC can either be valid or invalid. Every valid page in the EPC belongs to exactly one running instance of an enclave. Each running instance of an enclave in turn has exactly one EPC page holding its SECS 302.

The security attributes for each EPC page are held in an internal structure called Enclave Page Cache Map (EPCM) which is a secure structure used by the processor to track the contents of the EPC. The EPCM holds exactly one entry for each page that is currently loaded into the EPC. The format of the EPCM is microarchitectural, and consequently is implementation dependent. However, architecturally, the EPCM holds following information:

1. An indication whether the corresponding EPC page is valid.

2. If the page is valid, which running instance of enclave it belongs to. This is essentially back pointer to the SECS of the running instance of the enclave. A number of SE instructions follow this back pointer to read the contents of the SECS page.

3. If the page is valid, the type of the corresponding EPC page. Three types are supported: Regular Page (PT_REG), TCS Page (PT_TCS), and SECS Page (PT_SECS).

4. If the page is valid, the linear address through which the enclave is allowed to access the page.

5. If the page is valid, the enclave-specified read/write/execute restrictions on that page, if any.

The EPCM structure is used by the CPU in the address-translation flow to enforce access-control on the enclave pages loaded into the EPC. The EPCM structure is described in the co-pending applications, as is the conceptual access-control flow. The EPCM entries are managed by the processor as part of various instruction flows.

EPC 502 layout is specific to a model, and can be enumerated through various MSR. The co-pending applications describe enumeration for the mechanism of enumerating the EPC layout. At a high level, a CPU that supports SE supports the ability for the BIOS to reserve a physically contiguous range of memory called Processor Reserved Memory (PRM). PRM must have a size that is integer power of two, and must be naturally aligned. The BIOS identifies the PRM by setting a pair of MSRs, collectively known as the PRMRR 501.

Within the PRM, the processor supports one or more sections of the Enclave Page Cache (EPC). Each section of enclave page cache starts on a 4 KB boundary, and has a size that is integer multiple of 4 KB. Each section of EPC also has a security level associated with it. In one embodiment, two Security Levels are defined: Confidentiality-protected EPC (SL_CP), and Replay protected EPC (SL_RP). FIG. 5 illustrates one embodiment of a memory layout.

Note that some of the details from FIGS. 3-5 are not shown in FIG. 2 to avoid obscuring the underlying principles of the invention. In contrast to the GETSEC [SENTER] instruction which is capable of launching one measured launched environment at a time, multiple secure enclaves 250 may be executed within a single OS environment 251 (although only a single enclave is shown in FIG. 2 for simplicity). In addition, the mechanism for delivering a key into the enclave is inherent to the enclave, whereas with existing TXT implementations, the TPM creates a key and only releases it if a dynamic launch event has occurred.

As discussed in detail below, in one embodiment, native hardware capabilities 290 are provided to build and manage the secure enclaves 250. The term "native" in this context means that hardware capabilities are provided by a computer processor and/or chipset component (i.e., a separate, dedicated TPM chip is not required for implementing this embodiment of the invention). As shown in FIG. 2, the hardware capabilities include a set of platform PCR (pPCR) registers 201, Flags 202 (sometimes referred to as Intel Architecture (IA) Flags), a platform unique key 203, an owner epoch 204, attestation primitives 291 and a monotonic counter 207.

In a TPM device, as the computing platform boots, a hash is written for the data and program code which the TPM is about to process into a PCR register in the TPM. Consequently, in order to implement a software-based TPM 212, a measurement is initially sent to the pPCRs 201 in the early boot stages of the computing system. As is known by those of skill in the art, the PCR registers 201 are capable of performing "extend" operations while writing data. Specifically, an extend operation takes a value to be written and the previously stored value cryptographically hashes then together. As shown in FIG. 2, the set of pPCR 201 registers are provided within the native hardware based capabilities 290 to provide the same (or similar) functionality as standard TPM PCR registers. As the computing platform boots, it writes to the pPCR registers which performs extend operations while writing the data. Once the TPM 212 within the secure enclave 250 is up and running, it reads the pPCR register values into a storage area in memory, shown in FIG. 2 as temporary PCRs (tPCRs) 215.

In one embodiment, the operating system (OS) environment 251 and applications 220 which are hosted on the computing platform are untrusted by the secure enclave 250. Consequently, the secure enclave 250 needs to have a trusted path to read in data (e.g., data from the pPCRs). One embodiment of the invention uses the EGETKEY command described in the co-pending applications for reading hardware secrets. In particular, the EGETKEY command allows the secure enclave 250 to bring data directly into the enclave without an external OS call, as illustrated by the trusted paths 280-281 in FIG. 2. By way of example, and not limitation, the EGETKEY command may be used by the secure enclave 250 to read in data from the pPCRs into the tPCRs after the secure enclave 250 has been initialized. In one embodiment, the pPCR registers are registers within a central processing unit dedicated to performing PCR functions and the tPCRs are a software implementation of the pPCR registers used by the software-based TPM device 212.

In one embodiment, the secure enclave root key 218 (sometimes referred to as the "seal key" in the co-pending applications) is generated using data from Flags 202, the platform unique key 203, the owner epoch value 204, and attestation primitives 291. In one embodiment, the EGETKEY command combines these values together using an Advanced Encryption Standard (AES)-CMAC function (which is an National Institute of Standards and Technology (NIST) approved algorithm for deriving multiple keys from a single unique value).

The Flags 202 shown in FIG. 2 are flags associated with the secure enclave 250 indicating a particular mode of operation such as debug mode and/or an indication that the secure enclave 250 has been initialized. These are sometimes referred to as "attributes" of the enclave as defined in the co-pending applications. The Flags may be stored in a memory such as a register on the CPU.

In one embodiment, each computing platform is provided with a platform unique key 203 which may be permanently stored in the CPU and/or chipset components (e.g., by programming fuses). Enclave-specific keys such as the root key 218 are derived (in part) from the platform unique key 203. In one embodiment, a secure enclave 250 uses the EGETKEY command described in the co-pending applications to retrieve the platform unique key 203.

In one embodiment, the owner epoch value 204 is set in the computer system's basic input output system (BIOS). The user may change the owner epoch value, for example, when transferring the computer to another user. Changing the owner epoch effectively wipes away all of the original user's secrets (i.e., because it results in a new root key 218). Without this ability, a new user could gain access to the original user's secrets.

The attestation primitives 291 include measurement registers 205 and a platform attestation key 206. As described in the co-pending applications, in one embodiment, two measurement registers 205 are provided by the secure enclave: MREADD, which is a measurement of the data contained in the secure enclave; and MRPOLICY, which provides a measurement of a public key that signed the measurement of the enclave (i.e., identifying who produced the enclave). The platform attestation key 206 allows the enclave to demonstrate that the enclave actually exists. Specifically, the platform attestation key 206 may be used to sign the MREADD and the MRPOLICY values contained in the measurement registers 205, thereby demonstrating that the enclave was built on the computing platform. Thus, the platform attestation key performs a similar function to the attestation identify key (AIK) on a TPM device (i.e., the key signs to demonstrate that the TPM has the designated values).

As described in the co-pending applications, in one embodiment, four commands are used to build the secure enclave 250: ECREATE, EADD, EEXTEND and EINIT. Until these four commands are successfully executed, program code cannot be executed within the secure enclave 250. The first three (ECREATE, EADD, EEXTEND) build up a cryptographic measurement of the enclave itself. This is done in the memory region (e.g., a page of data) referred to above as the secure enclave control structure (SECS), which is specific to each enclave. As pages are built into the enclave the measurement registers are updated to include a cryptographic measurement of all of the data inside the enclave. Thus, by the time the EINIT command is executed, there is an identify value of everything stored in the enclave. Like the PCRs, the measurement registers 205 extend using hash values.

When all of the enclave pages have been added to the enclave, the OS environment 251 will execute the EINIT instruction initializing the enclave. A parameter to the EINIT instruction is a permit which demonstrates that the enclave is licensed to run on that machine. When an application is loaded a permit needs to be created. After EINIT successfully completes, the application can execute the EENTER command to enter the enclave.

In order to preserve data between instantiations of the secure enclave (e.g., platform resets) the root key 218 will be the same on each instantiation. A user may then encrypt and store data in external storage 210 (hard drive) and decrypt the data on a subsequent instantiation.

One embodiment of the invention includes a monotonic counter 207 which may be used for digital rights management on the computing platform. Specifically, the monotonic counter 207 may be used to prevent anti-replay attacks on DRM protected data. For example, if a user is only permitted to watch a particular movie three times, the user may make a copy after the second viewing (or sooner) and then replace it on the hard drive in an attempt to circumvent the DRM algorithm. To prevent this circumvention, as illustrated in FIG. 2, in one embodiment, the monotonic counter 220 may be used to count the number of times a file is accessed (e.g., played back in the case of a video) and determine if the file currently being accessed is the most recent version. In one embodiment, a set of software-based monotonic counters 214 are implemented within the TPM 212. The TPM 212 virtualizes the software based monotonic counters 214 out of the hardware-based monotonic counter 220.

As illustrated in FIG. 2, the TPM 212 includes a storage root key 217 used to encrypt all other keys within the TPM architecture. Also shown in FIG. 2 is a non-volatile memory 213 as required for implementing a TPM. Finally, an owner module 216 is used to identify the TPM's owner.

Other embodiments of the invention may be implemented on cellular phones and pagers (e.g., in which the software is embedded in a microchip), handheld computing devices (e.g., personal digital assistants, smartphones), and/or touch-tone telephones. It should be noted, however, that the underlying principles of the invention are not limited to any particular type of communication device or communication medium.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   a platform control register (pPCR);
   a memory device to store a protected page cache for a secure enclave, the secure enclave comprising a trusted execution environment to prevent external access to software and data within the secure enclave, the secure enclave to execute a trusted platform module (TPM) to securely read data from the pPCR into the memory; and
   logic to store processor values including:
   an owner epoch value;
   a platform unique key; and
   attestation primitives.

2. The processor as in claim 1, wherein the memory device provides a physically contiguous range of memory addresses reserved for the processor.

3. The processor as in claim 1 further comprising:
   flags register to store architecture state for the processor.

4. The processor as in claim 1, wherein the TPM includes a software-based platform control register (tPCR) to temporarily store data read from the pPCR register.

5. The processor as in claim 1, wherein the secure enclave is allocated a memory region including non-volatile memory.

6. The processor as in claim 3, wherein the flags register and the logic are used to generate a root key to encrypt data for the trusted platform module.

7. The processor as in claim 3, wherein the attestation primitives include a set of measurement registers (MRs), at least one of the MRs to provide a measurement of code and data contained in the secure enclave.

8. The processor as in claim 4, wherein the tPCR and pPCR are configured to extend using hash values via a cryptographic hash of a value to be written and a previously stored value.

9. The processor as in claim 7, wherein at least one of the MRs to provide a measurement of a public key used to sign the measurement of the enclave.

10. The processor as in claim 9, wherein the attestation primitives further comprise a platform attestation key used to sign data within the MRs to verify that the enclave was built on a computing platform associated with the processor.

11. An apparatus comprising:
    a processor including a memory device to store a protected page cache for a secure enclave, the secure enclave comprising a trusted execution environment to prevent external access to software and data within the secure enclave, the secure enclave to execute a trusted platform module (TPM) to securely read data from a platform control register (pPCR) of the processor into the memory device; and
    logic to store processor values including: an owner epoch value; a platform unique key; and attestation primitives.

12. The apparatus as in claim 11, wherein the memory device is an on-die memory device configured to provide a physically contiguous range of memory to the processor.

13. The apparatus as in claim 11, wherein the memory device is reserved for processor use.

14. The apparatus as in claim 11, wherein the memory device is embedded dynamic random access memory (eDRAM) or static random access memory (SRAM).

15. A system comprising:
    a memory device coupled with a bus;
    a memory encryption engine (MEE) to create a cryptographically protected region in the memory device;
    a processor coupled to the bus, the processor including a secure enclave comprising a trusted execution environment to prevent external access to software and data within the secure enclave, the secure enclave to execute a trusted platform module (TPM) to securely read data from a platform control register (pPCR) of the processor into the cryptographically protected region in the memory device; and
    logic to store processor values including: an owner epoch value; a platform unique key; and attestation primitives.

16. The system as in claim 15 further comprising an agent coupled with the bus and the MEE to recognize a memory access to the MEE and route the access to a cryptographic controller.

17. The system as in claim 15, wherein the cryptographically protected region includes a protected page cache for the secure enclave.

18. The system as in claim 16, wherein the cryptographic controller to generate one or more accesses to the memory device to fetch data from the cryptographically protected region.

19. The system as in claim 17, wherein the protected page cache is a physically contiguous range of memory reserved for use by the processor.

20. The system as in claim 17, wherein the protected page cache includes multiple sections, each section having an associated security level.

21. The system as in claim 18, wherein the cryptographic controller is further to decrypt the data from the cryptographically protected region to satisfy the memory access to the MEE.

22. The system as in claim 20, wherein the associated security level includes one of confidentiality protected and replay protected.

23. The system as in claim 22, wherein the processor additionally includes a monotonic counter to prevent anti-replay attacks on protected data and the TPM is further to virtualize the monotonic counter.

* * * * *